3,051,564
COMPOSITION FOR METALLURGICAL USE AND PROCESS OF USING THE SAME

John F. Drenning, Birmingham, Ala., assignor to The Carborundum Company, Niagara Falls, N.Y., a corporation of Delaware
No Drawing. Filed Aug. 12, 1959, Ser. No. 833,159
6 Claims. (Cl. 75—53)

This invention relates to a composition of matter that is useful in the production of cast iron. More particularly, the invention relates to a composition of matter and to a process for using this composition of matter in the production of gray iron by addition to the cupola for contact with the molten iron.

It has become a widespread practice to use briquettes of silicon carbide in the production of cast iron, for addition to the cupola along with the regular charge. Gray cast iron that is produced in this way has improved fluidity, yields sounder castings, and shows less "chill." It is found to have a more uniform microstructure.

These silicon carbide briquettes ordinarily are prepared from metallurgical grade silicon carbide. This grade of silicon carbide may be a mixture of particulate, silicon carbide-containing material, from several sources. To make the briquettes, the metallurgical grade silicon carbide is usually reduced to a standard size, and then bonded with an inorganic cement bond into a desired size, shape, and weight briquette. Sufficient cement or other binder is employed to make a strong briquette that will withstand handling and that will retain its shape in the cupola until the bond is destroyed by contact with the molten slag.

In some cases, small amounts of sodium carbonate, or other alkaline materials, have been employed as fluidizing agents in the briquettes. The use of these agents tends to cause turbulence in the molten iron and enhances the effectiveness of the silicon carbide by causing a more thorough distribution of it throughout the molten iron.

One object of the present invention is to provide an improved composition of matter, that can be used in briquette form, for treating molten iron with silicon carbide.

A related object of the invention is to provide an improved process for treating molten iron with silicon carbide.

Other objects of the invention will be apparent hereinafter from the specification and from the recital of the appended claims.

I have now discovered that when a composition of matter is employed that contains a major proportion of silicon carbide, together with in excess of about 10 parts by weight of an alkaline modifying agent such as, for example, sodium carbonate, per 100 parts by weight of pure silicon carbide, unexpectedly good results are obtained. For example, when a briquette is employed that contains about 15 parts by weight of sodium carbonate per 100 parts by weight of pure silicon carbide, to treat gray cast iron in the cupola, a cast iron is obtained that has an unexpectedly high silicon content, and superior fluxing action is obtained in the cupola.

The composition that is used, according to my invention, and the excellent silicon pickup that is obtained, are particularly striking because the composition employed differs from standard practice in a manner that would not ordinarily suggest itself to one skilled in the art. In the past, when it has been desired to increase the silicon content of a heat, the common practice has been to utilize a superior, that is, a purer, grade of silicon carbide, to enhance the silicon pickup. This adds a great deal to the expense of silicon carbide treatment, since the cost of briquettes goes up sharply as the silicon carbide content is increased. For example, a single automotive foundry may employ 100 tons of briquettes containing silicon carbide in one week. The cost of the briquettes in such a case is an important factor in determining the cost of the output of the foundry, and every effort is made to employ inexpensive materials.

Partly for cost reasons, the use of alkaline materials, such as sodium carbonate, as fluidizing agents, has often been deliberately avoided in the past, despite the fact that the use of these materials enhances the action of the silicon carbide by effecting a more even distribution of the silicon carbide throughout the molten iron. The omission of an alkaline material from a briquette, when a given grade of silicon carbide is used, permits the same weight of briquettes to contain a greater total amount of silicon carbide. If the foundryman is judging his results from input rather than output, such a briquette may be appealing. Alternatively, a less pure grade of silicon carbide can be used when the soda ash is omitted, to make a briquette with the same total silicon carbide content as the briquette that contains soda ash, but at less cost. The results are not as desirable in many cases, but the cost factor may overweight the less desirable results.

My invention involves increasing the amount of soda ash in the briquette, without necessarily upgrading the silicon carbide that is employed. When the metallurgical grade of silicon carbide is unchanged, the increased amount of soda ash per briquette necessarily decreases the total amount of pure silicon carbide in each briquette of the same weight. However, I have found that in such a case, when the same total weight of briquettes, per cupola charge, is used as before, superior results are obtained by reason of the unexpectedly high silicon pickup. I thus can use less total silicon carbide to obtain a given silicon pickup, than is necessary if soda ash, in the amounts of my invention, is not used. This is an unexpected result that is not predictable from prior art experience. Alternatively, however, a more pure grade of silicon carbide can be employed, to maintain the silicon carbide content of the briquettes at the same level as previously.

In practicing my invention, briquettes are prepared in the following manner. Metallurgical grade silicon carbide grain is selected that has a graded particle size, so that it will pack into a dense mass. Sodium carbonate, of fine particle size, is mixed with the metallurgical grade grain. A binder is then added to this mixture, in sufficient quantity to hold the mixture to a desired briquette shape. The mixture is then cast or pressed, and after setting, is ready for use.

The amount of sodium carbonate employed, according to this invention, is in excess of 10 parts per 100 parts of silicon carbide. All parts of percentages referred to herein are by weight. A preferred amount is 15 parts per 100 parts silicon carbide. Larger amounts can be employed, but ordinarily no more than about 20 parts of soda ash per 100 parts of silicon carbide will be employed because it is preferable to maintain the pure silicon carbide content of the briquette above 50%, preferably in the range 60% to 75%, and this is difficult to do economically if more than 20 to 25 parts by weight of soda ash, per 100 parts silicon carbide, are used.

The binder for a briquette can be an organic pitch such as cellulose sulphite pitch or tar, but an inorganic cement binder is preferred. Cements such as Portland cement, magnesium oxychloride cement, a mixture of these two cements, hydrated lime, and argillaceous bonds can be used, most of which tend to increase the basic character of the slag in the cupola. Preferably the cement is mixed with the sodium carbonate, or other alkaline agent, and the silicon carbide, to make a wet slurry, which is then cast without the usual danger of destructive abrasion of the mold parts or extruding orifices by the silicon carbide grain.

Alternatively, the mixture of silicon carbide and sodium carbonate can be mixed with a temporary binder and formed into briquettes, and then the briquettes can be dipped into a slurry of cement or into a solution of sodium silicate. The temporary binder can be any of the common ones that are used in the fabrication of ceramic articles. Among the more common of such temporary binders are the lignin derivatives obtained from cellulose sulphite liquor and sold under various trade names. These have been found to be satisfactory.

Both methods should form, on the briquettes, a strong outer shell that resists crumbling or disintegration until the binder is destroyed upon contact with the molten slag in the cupola. The minimum amount of cement, or other binder, that will achieve these purposes, should be used, in order that the briquette can contain a maximum amount of silicon carbide. With Portland cement, for example, an amount of cement equivalent to up to 20% by weight of a briquette, dry basis, can be used; however, 10% to 12% is a preferred amount.

It is highly desirable to incorporate in a briquette a small amount of a mineral that exfoliates under the influence of heat, as taught in the U.S. patent to R. W. Stohr, 2,497,745, issued February 14, 1950. From 0.5% to 5% of vermiculite, for example, in a briquette, is effective in shattering the briquette and thus bringing the silicon carbide more rapidly into intimate contact with the molten iron.

The following examples are representative of briquettes prepared in accordance with this invention:

*Example 1*

|  | Parts | Percent |
| --- | --- | --- |
| Sodium carbonate | 15 | 9.8 |
| Portland cement | 16.5 | 10.9 |
| Vermiculite | 1.5 | 0.9 |
| Silicon carbide, metallurgical grade (approximately 84% SiC) | 119 | 78.4 |

The foregoing, when mixed with water and allowed to set, produces a briquette that is dense, hard, and weather resistant. When used in the cupola, silicon pickup is remarkably increased, and the usual beneficial effects of silicon carbide treatment are also obtained.

*Example 2*

Another raw batch for a briquette, that also produces excellent results, and that contains a very low but effective amount of soda ash, thereby permitting the use of a low grade of metallurgical silicon carbide, is as follows:

|  | Parts | Percent |
| --- | --- | --- |
| Sodium carbonate | 6.5 | 6.9 |
| Portland cement | 10.5 | 10.8 |
| Vermiculite | 1 | 1.0 |
| Silicon carbide, metallurgical grade (approximately 82% pure SiC) | 79 | 81.4 |

*Example 3*

When a high grade of metallurgical silicon carbide is available, a suitable briquette batch is as follows:

|  | Percent |
| --- | --- |
| Sodium carbonate | 13 |
| Portland cement | 11 |
| Vermiculite | 0.5 |
| Silicon carbide, metallurgical grade (approximately 86% SiC) | 75.5 |

*Example 4*

Another satisfactory raw batch for a briquette is as follows:

|  | Percent |
| --- | --- |
| Fluorspar | 10 |
| Portland cement | 11 |
| Vermiculite | 1 |
| Silicon carbide, metallurgical grade (approximately 83% SiC) | 78 |

Instead of soda ash and fluorspar, other alkaline agents can be used, such as, for example, lye, sodium bicarbonate, sodium oxide, potassium carbonate, lithia, and the like.

While I prefer to use the mixture of silicon carbide and sodium carbonate in the form of briquettes for convenience in handling, it is possible to use a loose mixture, or to pack the loose grain in a combustible container, with substantially equivalent results. Good results are also obtained, when loose grain is used, by encapsulating the silicon carbide grain in a thin shell or layer of sodium carbonate, or other equivalent alkaline agent, in the proper amount. This can be done by coating the grain with a sodium carbonate slurry or solution, for example, or in any convenient manner.

When briquettes are employed, k I prefer to add the briquettes directly to the charge in the cupola, in an amount corresponding to about 1% to 2% of the iron charge, because solution is more readily effected than when the addition is made to the metal in the ladle. In some cases, however, equally good results are obtained by adding the composition of this invention directly to the molten metal in the ladle.

In comparative testing of two different types of silicon carbide briquettes, using a 1% addition of briquettes to the cupola, one type, (A), containing 15 parts of soda ash per 100 parts of silicon carbide (pure), and the other type, (B), containing only about 6 parts of soda ash per 100 parts of silicon carbide (pure), in an automotive foundry, it is observed that the gray cast iron produced by treatment with the briquette, (A), containing the greater amount of soda ash has a silicon recovery 14% greater than the gray cast iron treated with the briquettes, (B), containing the smaller amount of soda ash. This is particularly remarkable in view of the fact that the type (A) briquettes, that contain the larger amount of soda ash, contain 2.97% less silicon carbide than the briquettes that contain the smaller amount of soda ash. In other comparative testing of these two types of briquettes, in a foundry, again using a 1% addition of briquettes to the cupola, an unexpected increase in silicon pickup is again observed with the briquette containing the larger amount of soda ash. With briquette (B), the silicon content of iron is 1.701%; with briquette (A), it is 1.748%. A typical silicon content, when no briquettes are used at all, is 1.351%. Therefore, briquette (B) can be expected to increase the silicon content of the iron by 35 points (0.350%). Briquette (A) therefore produced an unexpected increase in the silicon pickup of 4.7 points, or an increase of 12.8%, despite the lower content of silicon carbide.

There appears to be no basis for predicting the increase in silicon pickup that is obtained through the use of briquettes that contain the greater amount of soda ash. Based on this and other evidence, the minimum amount of alkaline modifying agent that appears to be necessary, to effect an increase in silicon pickup, is about 10 parts per 100 parts of silicon carbide (pure).

While the invention has greatest utility in connection with automotive irons and cast irons, the improved briquettes of this invention can be used advantageously wherever a superior silicon carbide additive may be beneficial.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

I claim:

1. The process of melting iron for castings comprising bringing a mixture comprising a major proportion of silicon carbide and in excess of about 10 parts up to about 25 parts by weight of an alkaline modifying agent per 100 parts by weight of pure silicon carbide into contact with the molten iron.

2. The process of improving the characteristics of iron comprising bringing into contact with molten iron a mixture comprising a major proportion of silicon carbide and in excess of about 10 parts up to about 25 parts by weight of sodium carbonate per 100 parts by weight of pure silicon carbide.

3. The process of improving the characteristics of iron comprising bringing into contact with molten iron a mixture comprising a major proportion of silicon carbide and about 15 parts by weight of sodium carbonate per 100 parts by weight of pure silicon carbide.

4. A composition of matter that is useful for treating molten iron by addition thereto comprising a major proportion of silicon carbide and in excess of about 10 parts up to about 25 parts by weight, per 100 parts by weight of pure silicon carbide, of an alkaline modifying agent.

5. A composition of matter that is useful for treating molten iron by addition thereto comprising a major proportion of silicon carbide and in excess of about 10 parts up to about 25 parts by weight, per 100 parts by weight of pure silicon carbide, of sodium carbonate.

6. A composition of matter that is useful for treating molten iron by addition thereto comprising a major proportion of silicon carbide and about 15 parts by weight, per 100 parts by weight of pure silicon carbide, of sodium carbonate.

References Cited in the file of this patent

UNITED STATES PATENTS

| | | |
|---|---|---|
| 1,420,980 | Eichenberger | June 27, 1922 |
| 2,119,521 | Brown | June 7, 1938 |
| 2,497,745 | Stohr | Feb. 14, 1950 |
| 2,540,173 | Olivo | Feb. 6, 1951 |